May 16, 1933. C. L. PUTNEY 1,909,720
CLUTCH OPERATING MECHANISM
Original Filed Dec. 20, 1927
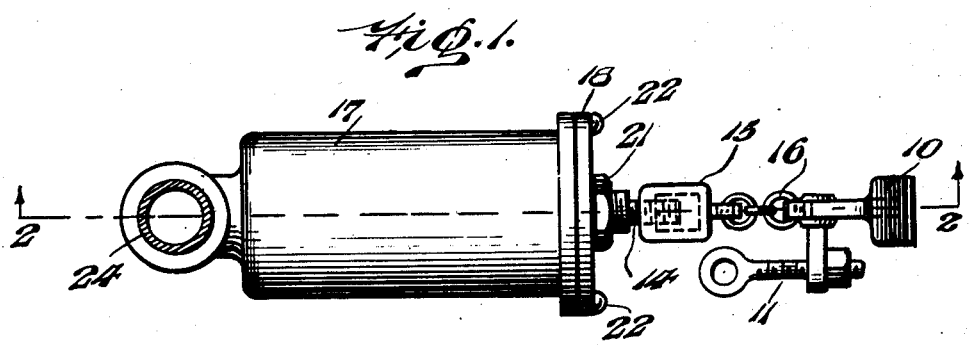
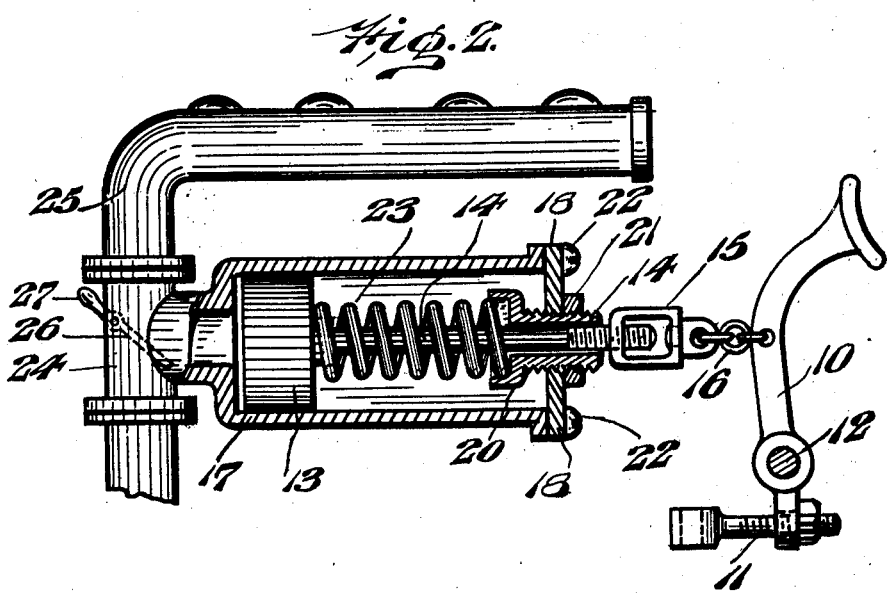
INVENTOR
Charles L. Putney,
BY Robert M. Barr
ATTORNEY Patented May 16, 1933

1,909,720

UNITED STATES PATENT OFFICE

CHARLES L. PUTNEY, OF PHILADELPHIA, PENNSYLVANIA, ASSIGNOR OF ONE-THIRD TO CHARLES H. STOER, OF PHILADELPHIA, PENNSYLVANIA

CLUTCH OPERATING MECHANISM

Application filed December 20, 1927, Serial No. 241,281. Renewed October 6, 1932.

The present invention relates to power transmission devices and more particularly to a control for automatically causing the engagement and disengagement of an automobile clutch.

In the automobile in common use there is interposed between the engine and the reducing gears a manually operated clutch that disconnects the engine from the load through the gears. A gear change introducing high torque is necessary in starting the load from rest to avoid sudden starting or straining the parts and also is necessary when the road resistance increases to such an extent so that the engine slows down to a point where it cannot develop enough power to propel the machine. This is due to the fact that the power developed in an internal combustion engine is proportional to the speed, and so long as the engine is directly connected to the load the speed of the engine is in direct proportion to the speed of the load. The clutch is necessary because at each change of gears the engine must be disconnected from the load so that gear meshing can be easily accomplished. If a mechanism can be devised so that the engine can maintain speed independent of the speed of the car, then a gear change would not be necessary. This can only be done by a slipping clutch where the clutch slips until the car has accelerated to such a speed that the engine can maintain sufficient power to propel the car when directly connected. A skilled driver can set his gears in "high", which is a direct connection, and allow the clutch to slip when starting, and by doing so can accelerate the load from rest and at the same time maintain speed and power with his engine although the car will not move in direct speed to the engine until he stops clutch slipping. Likewise, on a hill when the engine is losing power due to loss of speed from being direct connected, a skilled operator can increase his engine power by allowing the clutch to slip, which will allow the engine to increase speed and power, although the load may be moving slowly, but this increased power will enable him to carry the load past the emergency condition. The clutch plates have only a small movement from the clutching to declutching position, then proper slipping is very difficult because the movement of the car especially on rough roads will cause the foot pressure to be unsteady.

Some of the objects of the present invention are to provide an improved clutch control mechanism for automobiles and other motor driven vehicles; to provide a mechanism which makes gear shifting unnecessary; to provide an automatic means for actuating the clutch pedal of an automobile in ratio to the engine speed and load; to provide an automatic control for a clutch pedal which does not interfere with the ordinary manual gear shifting operations if it is desired to use the latter; and to provide other improvements as will hereinafter appear.

In the accompanying drawing, Fig. 1 represents a plan of an automatic clutch control mechanism embodying one form of the present invention; and Fig. 2 represents a section on line 2—2 of Fig. 1.

Referring to the drawing, one form of the present invention is shown as applied to the ordinary clutch pedal 10 of an automobile and which is arranged to control the clutching and declutching of the plates of the customary clutch interposed between the driving shaft and the driven shaft of the automobile. The clutch, as will be understood, embodies a spring normally forcing the clutch plates to clutching relation and plate movement for declutching takes place through rigid connection of an eye-bolt 11 with the end of the clutch pedal 10 on the opposite side of the pivot 12. In the manual control of the clutch, the pedal 10 is always in clutching position when the engine is at rest unless held down by the foot of the operator, while in accordance with the present invention the pedal 10 is always in declutching position when the engine is at rest.

For the purpose of holding the pedal 10 in declutching and its several control positions, a piston 13 is provided having a rod 14 connected through a turn-buckle 15 and chain links 16 with the clutch pedal 10. The piston 13 is mounted for sliding movement in a fixed cylinder 17 and the rod 14 extends through the head 18 by way of a tubular follower 20 which is threaded into the head 18 and made fast in adjusted position by a nut 21. The head 18 is preferably removably attached to the cylinder 17 by screws 22 or other fastening means. Between the piston 13 and the follower 20, a spring 23 is interposed and held under the desired compression by the proper adjustment of the follower 20 by the nut 21. The pressure of the spring 23 against the piston 13 is so proportioned with respect to the pressure of the clutch spring acting against the clutch pedal 10 in opposition to the spring 23 as to hold the clutch pedal 10 in declutched position.

In order to vary the pressure relation between the spring 23 and the spring of the clutch to cause the latter to overcome the pull of the former, the cylinder 17 is mounted upon a T 24 located in the exhaust pipe 25 from the engine and the arrangement is such that the exhaust pressure has free access to the end of the cylinder 17 on the opposite side of the piston 13 from the spring 23. Preferably, the T 24 has a movable flap valve 26 pivoted in it and controlled by an exterior handle 27 for the purpose of deflecting the exhaust pressure into the end of the cylinder 17 but without producing any undesirable choking of the exhaust gases.

With the device of the present invention installed upon an automobile, an initial adjustment of the spring 23 is made to insure the clutch pedal 10 being held in declutched position when the engine is at rest or is idling. This adjustment is preferably made with the engine running at idling speed and the spring 23 holds the piston 13 at the exhaust pressure end of the cylinder 17. The piston rod 14 is connected by means of the chain links 16 to the clutch pedal 10 and the turn-buckle 15 is then adjusted to place the spring 23 under the desired compression to move and hold the clutch pedal 10 in its declutched position. With the parts so adjusted, the device is ready for operation and the transmission of the automobile may be thrown into high gear because the clutch is disconnected just as it would be by pressing it down by foot operation. For starting the automobile, the engine speed is increased and consequently the exhaust pressure from the pipe 25 will increase its pressure upon the piston 13 and the latter will be moved toward the clutch pedal 10 thereby relieving the holding pressure and allowing the spring in the clutch to move the clutch plates into clutching relation so that motion is transmitted to the automobile. The greater the pressure in the exhaust pipe, the greater will be the clutching action of the clutch plates, and consequently at high speeds the transmission of power will be accomplished economically and efficiently. Where the load places an increased demand for power upon the engine, such as would normally require a change from high gear to intermediate or possibly to low gear, the decrease in pressure of the exhaust will restore the action of spring 23 to lessen the pulling power of the clutch spring and automatically allow the clutch plates to slip so that the engine can pick up its speed to meet the new load conditions and again the clutch pedal will be returned to full clutching position for continued running in high gear.

By the provision of the link construction 16, it will be evident that the clutch can still be manually operated if desired, because pressure of the foot upon it will cause it to move freely to declutched position irrespective of the automatic controlling means.

It will now be apparent that a complete unitary automatic control has been provided for the clutch pedal of an automobile, whereby the latter is automatically moved to declutching position as well as to clutching position, and under all running conditions automatically changes its position in direct ratio to the speed of the engine and the load. While but one form of the present invention is here shown, it is to be understood that broadly the present concept includes any type of pressure actuated device operating to control a clutch pedal, and is not to be limited to control through variations in pressure in the exhaust line of an automobile.

Having thus described my invention, I claim:

1. The combination of an automobile clutch pedal normally held in clutching position by the spring of the automobile clutch and an automatic control mechanism therefor comprising spring actuated means acting in opposition to said clutch spring for moving said clutch pedal to declutched position, means for adjusting said moving means to retain said clutch pedal in declutched position, pressure operated means for reducing the effectiveness of said holding means to move said clutch pedal to partial or full clutching position dependent upon said pressure, and a flexible connection between said clutch pedal and said automatic control mechanism whereby said clutch pedal is free for manual operation at any time.

2. The combination of an automobile clutch pedal normally held in clutching position by the spring of the automobile clutch and an automatic control mechanism therefor comprising a cylinder, a piston in said cylinder, a flexible connection between said piston and said clutch pedal, a spring arranged to move said piston in opposition to said clutch spring, means for varying the tension of said piston spring, and means to introduce the exhaust pressure from the engine of the automobile into said cylinder to act on said piston in opposition to said piston spring.

Signed at Philadelphia, county of Philadelphia, State of Pennsylvania, this 17th day of December, 1927.

CHARLES L. PUTNEY.